Sept. 10, 1968 R. P. ACHE ET AL 3,401,251
APPARATUS AND METHOD FOR JOINING TUBES TO PLATE
Filed Oct. 21, 1965 4 Sheets-Sheet 2

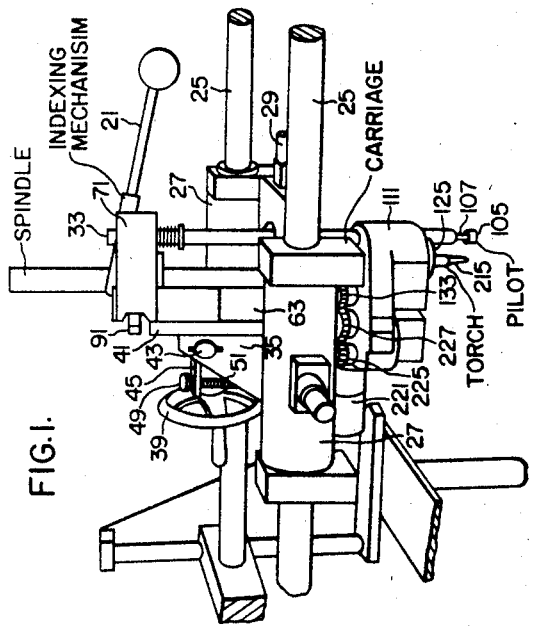
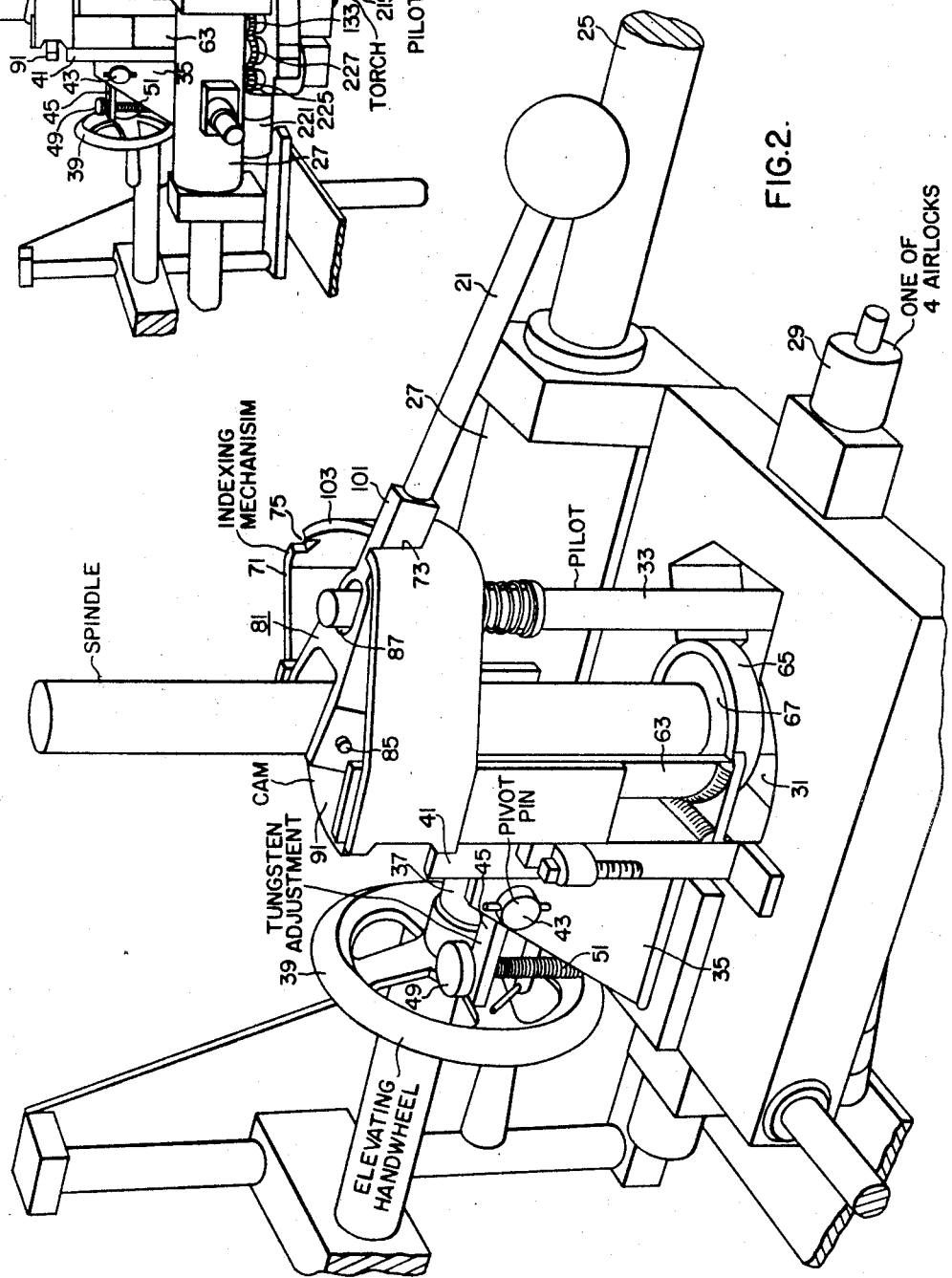

INVENTORS
Richard P. Ache
and Raymond H. Glatthorn
BY
Hymen Diamond
ATTORNEY

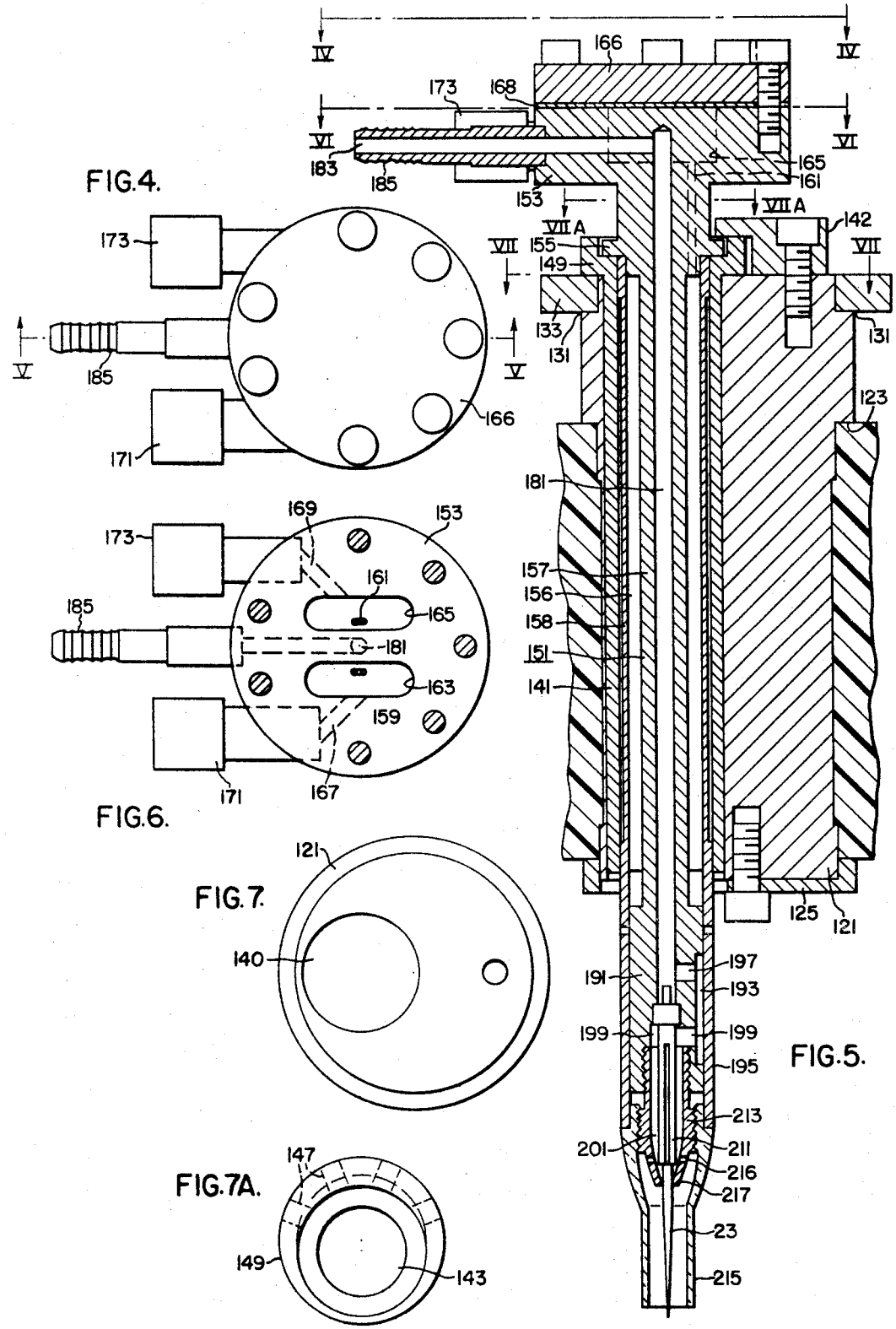

Sept. 10, 1968  R. P. ACHE ET AL  3,401,251
APPARATUS AND METHOD FOR JOINING TUBES TO PLATE
Filed Oct. 21, 1965                                4 Sheets-Sheet 4

United States Patent Office 3,401,251
Patented Sept. 10, 1968

3,401,251
APPARATUS AND METHOD FOR JOINING
TUBES TO PLATE
Richard P. Ache, Broomall, and Raymond H. Glatthorn,
Nether Providence Township, Media, Pa., assignors to
Westinghouse Electric Corporation, Pittsburgh, Pa., a
corporation of Pennsylvania
Filed Oct. 21, 1965, Ser. No. 499,349
9 Claims. (Cl. 219—125)

This invention relates to metals joining and has particular relationship to the joining metallurgically of tubes into a plate or a sheet. In joining a tube to a plate, the tube is inserted in the plate defining a joint between the tube and the plate and a metallurgical bond is produced at the joint by arc-welding. An arc is fired between an electrode and the joint, and the electrode is moved around the joint in welding relationship with the joint. Typically, the joint may be of circular form and the electrode is rotated about the joint.

In the fabrication of tube-plate assemblies, arc-welding of different types has been used. The welding may be carried out by manual welding with a flux-coated electrode or by semiautomatic or automatic welding with a consumable electrode. The welding may also be carried out by fusion welding with a nonconsumable electrode. A filler may be added to the arc produced between the nonconsumable electrode and the joint. This invention concerns itself principally with fusion welding with a nonconsumable electrode but in certain of its aspects may be applied to welding of other types.

The producing of tube-to-plate-or-sheet assemblies in accordance with the teachings of a prior art is typified by Ache Patent 3,064,120. This patent discloses an assembly including a welding torch suspended plurality of legs which are set in tubes of joints adjacent to the joint to be welded. The legs serve to center the electrode of the torch with reference to the joint to be welded and the joining is carried out by firing tn arc between the electrode and the joint and moving the electrode around the joint while the electrode is so centered by the legs. The teaching of this patent has been found to be highly satisfactorily applicable to the fabrication of tube-plate assemblies, but to apply this invention, it is necessary that the holes in the plate in which the joints are formed be precisely positioned with reference to each other. In situations in which the cost of precisely positioning the holes is not warranted, the distances between the holes varies to such an extent that the electrode cannot be located effectively for welding a joint by the legs positioned in the adjacent holes.

Glatthorn Patent 3,209,120, granted Sept. 28, 1965 is also applicable to the metallurgical fabrication of tube-plate assemblies. This invention is peculiarly adapted for use in situations in which the tubes project through the holes so that their rims extend above the surface of the plates at the joint to be welded and is not readily used where the rims of the tubes are flush with, or below, this surface. The practice of this invention, while satisfactory for many purposes, is complex and costly because it usually requires that a filler electrode be supplied during the welding. Nor is this invention applicable to the welding of tubes which are of small diameter and are closely spaced.

It is accordingly, an object of this invention to overcome the above-described difficulties and to provide low-cost apparatus and a low-cost method for fabricating tube-plate-or-sheet assemblies in which the tubes are inserted to form the joints to be welded in holes which have not been precisely located. Another object of this invention is to provide apparatus and a method of fabricating a tube-plate assembly by arc-welding, which shall be readily applicable to the welding of assemblies whose tubes do not extend through the holes above the plate surface at the joints where the welding is carried out and also to the fabricating of assemblies whose tubes are of relatively small diameter and are closely spaced in the plate.

In accordance with this invention, the location of the welding electrode is effected by indexing the electrode to the welding position with reference to a joint after a centering pilot, to which the electrode is connected has located the axis of the joint. It the practice of this invention, the pilot and the welding torch are mounted on a carriage which is movable to the approximate position where the joint is to be welded. The pilot is then centered in the joint and the carriage is locked. The pilot is then indexed from the joint and the torch is indexed so that the welding electrode is in welding relationship with the joint. An arc is then fired between the welding electrode and the joint and the electrode and arc are moved around the joint to produce the metallurgical bond.

For a better understanding of this invention, both as to its organization and as to its method of operation, together with additional objects and advantages thereof, reference is made to the following description taken in connection with the accompanying drawings in which:

FIGURE 1 is a view in perspective of apparatus in accordance with this invention;

FIG. 2 is a view in perspective of this apparatus showing the indexing mechanism;

FIG. 4 is a view in end elevation of the torch of the apparatus shown in FIG. 1;

FIG. 5 is a view in section taken along line V—V of FIG. 4;

FIG. 6 is a view in end elevation of the electrode supporting shaft of the torch shown in FIG. 5 showing the manner in which shielding gas and cooling fluid are transmitted to the welding electrode;

FIG. 7 is a view in end elevation showing the supporting body, of the torch shown in FIG. 5;

FIG. 7A is a view in end elevation of the eccentric bushing of the torch shown in FIG. 4 which serves to set the radius over which the electrode rotates;

Figure 3:
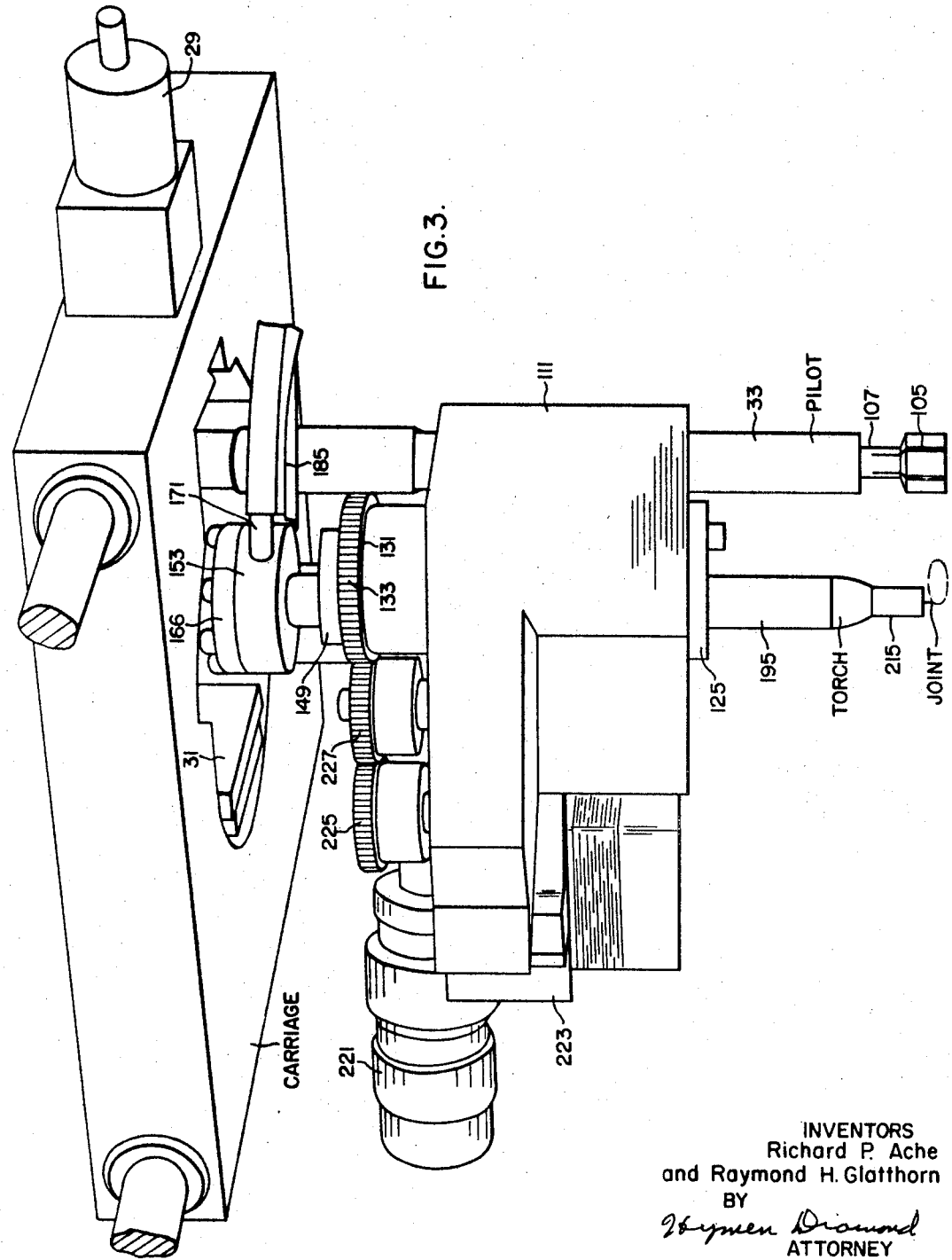
FIG. 3 is a view in perspective of this apparatus showing particularly the centering pilot, the torch and the drive for the torch.

The apparatus shown in the drawings includes a carriage in which a spindle, an indexing mechanism, a torch, and a centering pilot are mounted. The spindle carries the pilot and torch and may be indexed by operation of a handle 21 from a position in which the pilot is centered in a joint to a position in which the torch is centered with its electrode 23 (FIG. 5) centered on the joint. The carriage is suspended from tracks 25 by roll-ball bushings 27 by means of which the carriage may be readily moved along the tracks 25. In FIG. 2, only one of the roll-ball bushings 27 is shown; the other is removed so that the parts behind it may be more readily seen. The carriage may be locked in any position by compressed air supplied to the bushings 27 through air locks 29 mounted on both ends of the carriage and in communication with the bushings.

Figure 12:
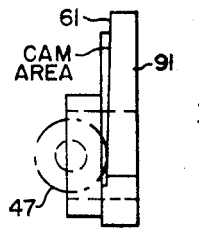
FIG. 12 is a view in side elevation showing the cam and the cam follower.
Figure 11:
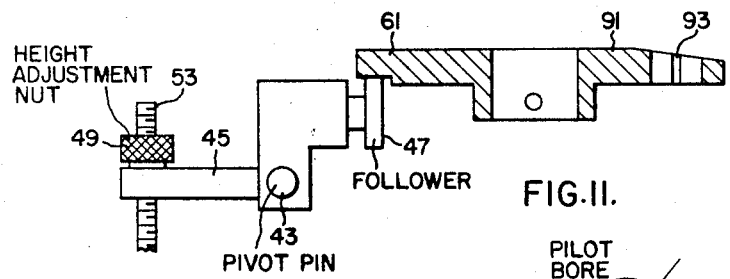
FIG. 11 is a view in section taken along the line XI—XI of FIG. 11 showing in addition the cam follower mechanism which is cooperative with the cam shown in FIG. 10.

The carriage is provided with an opening 31 through which the spindle and the centering pilot shaft 33 extend. A bracket 35 is secured to the carriage adjacent the opening. This bracket 35 carries a bearing 37 for a handwheel 39 on the inner end of which a pinion (not shown) is mounted. The pinion is in engagement with a rack 41 which is moved vertically by rotation of the handwheel 39. A pivot pin 43 is also secured to the bracket 35 and a lever 45 is pivotal on this pin. This lever 45 carries a cam follower 47 (FIGS. 11 and 12) at its inner end and engages a height adjustment nut 49 which may be screwed against the action of a spring 51 onto a screw 53 extending from the bracket 35 at its outer end. The follower 47 is cooperative with a cam 61 which is vertically movable with the spindle and torch. During centering the cam raises the torch away from the work so that the electrode 23 is not broken by an obstruction; for welding the cam drops the torch to welding position while the pilot remains well out of the path of the torch.

A support 63 extends integrally from the lower end of the rack 41 and carries a horizontal bearing 65. The spindle extends upwardly and downwardly from a cooperative bearing 67 which rotatably engages bearing 65.

Figures 8, 9:
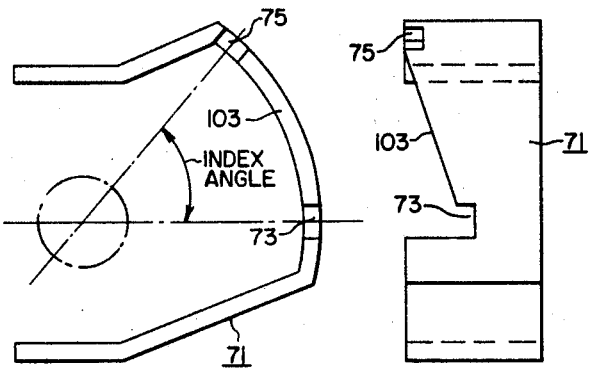
FIG. 8 is a view in end elevation showing the indexing frame of the apparatus shown in FIG. 1.
FIG. 9 is a view in top elevation of this indexing frame.
Figure 10:
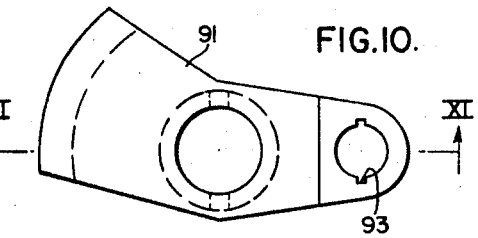
FIG. 10 is a view in top elevation of the cam, of the apparatus shown in FIG. 1, which, after a welding operation, raises the tungsten electrode clear of the tube sheet when the centering pilot is being brought into position for centering for the next welding operation.

An indexing frame 71 is secured near the upper end of the support 61. This frame 71 is of generally U-shaped form (FIGS. 9 and 10) and has at the closed end a pair of indexing slots 73 and 75 for setting the pilot and torch in the centering and welding positions. The centering notch 73 is at lower level than the welding notch 75 and is connected to the welding notch through a portion of the closed part of the indexing frame 71 which rises from the centering notch 73 to the indexing notch 75. Because of this rise, the pilot is raised when it is moved from the centering position to the welding position.

The indexing is effected by rotating and pivoting the pilot about the spindle. The spindle is rotatable by the indexing handle or lever 21. This lever 21 carries a bifurcated member 81 at the end remote from its knob 83. A pin 85 passes through the spindle and engages the prongs of the member 81. The indexing lever 81 may be pivoted vertically on the pin 85, but rotation of the lever rotates the spindle. The member 81 also has a slot 87 inwardly of the prongs. The upper end of the shaft 33 of the pilot is pinned to the walls of this slot 87. The pin (not shown) through the pilot shaft 33 passes through a slot (not shown) in the walls of the slot 87 so that the pilot shaft 33 may move relative to the slot 87 during the pivoting.

The cam 61 (FIGS. 10, 11 and 12) is integral with a plate 91 that extends in the indexing frame 71 to a position below the member 81 and the indexing lever 21 in the frame. The cam 61 is pinned to the spindle but is keyed to the pilot shaft 33 by a key in a keyway 93 which permits the shaft 33 to move vertically relative to the cam 61. During the pivoting, the cam 61 moves with the spindle as the spindle is rotated between the centering and welding positions.

The pilot shaft 33 is provided with a collar or shoulder 95 which is engaged by a spring 97. The opposite end of the spring 95 engages the lower surface of the plate 91. The spring 95 exerts a downward pull on the pilot shaft 33 and on the indexing lever 21. By reason of this downward pull, the rectangular portion 101 of the member 81 is held in firm engagement with the inclined portion 103 of the indexing frame 71 between the centering slot 73 and the welding spot 75.

The cam 61 engages the cam follower 47 which is adjustably suspended from the bracket 35. By the pivoting movement of the indexing lever 21 from the centering slot 73 to the welding slot 75, the cam 61 and the parts connected to it including the spindle and torch are dropped so that the welding electrode 23 may be moved in welding relationship with the joint without interference from the pilot.

Figure 13:
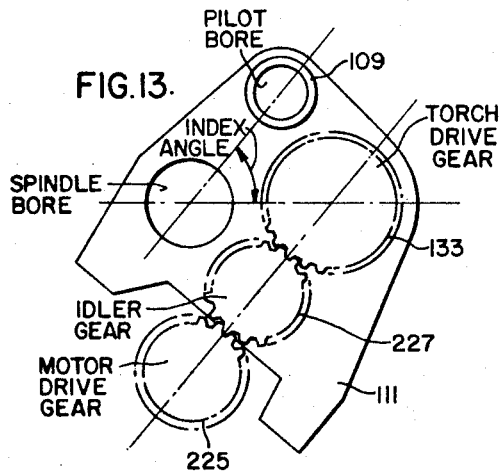
FIG. 13 is a view in elevation showing the support for the torch.

The torch and its drive are supported on an insulating block 111 typically of a phenolic condensation product. The spindle passes into this block and is pinned therein. The pilot shaft 33 passes through a bearing 109 (FIG. 13) in this block 111 and is slidable in this bearing. The pilot includes a split knob 105 extending from a split pin 107 which is suspended from the pilot shaft 33. The diameter of the knob 105 is dimensioned so that the knob 105 may be slipped into the tube of the joint to be welded in centering relationship with the joint.

The bracket 111 has an opening in which the torch is secured. The cylindrical supporting body 121 of the torch engages this opening and is held in the bracket 111 between a shoulder 123 of the body and a retaining ring 125. The body has an additional shoulder 131 against which the drive gear 133 for the torch is mounted. Rotation of the drive gear 133 rotates the body 121 and revolves the electrode 23 about the axis of rotation of the torch. The centering and welding slots 73 and 75 in the indexing frame are so spaced that when the spindle is moved from the centering position to the welding position, the axis about which the electrode 23 is rotatable replaces the axis of the pilot in centered relationship with the joint to be welded.

A sleeve 141 extends through an eccentric opening 140 (FIG. 7) in the supporting body 121 and is clamped to the supporting body by a clamp 142. This sleeve 141 has a countersunk eccentric opening 143 (FIG. 7A). The sleeve 141 has a shoulder 145 which engages the supporting body 121 and is rotatable relative to the supporting body so that the center of the eccentric opening 143 may be spaced at different distances from the center of the supporting body 121 about which the torch is rotatable. Lateral holes 147 are provided in the head 149 of the sleeve to rotate the sleeve.

The electrode 23 is supported on the lower end of a shaft 151 which is water cooled and through which shielding gas flows. The shaft 151 has a head 153 and a shoulder 155 and below the shoulder 155 has a long intermediate attenuated section 157. The groove 156 formed by this section 157 is closed by a shell 158 brazed to the shoulder 155, and is connected through axial channels 159 and 161 with corresponding countersunk grooves 163 and 165 respectively in the head. The grooves 163 and 165 are connected through transverse channels 167 and 169 respectively in the head 153 to water fittings 171 and 173 (FIG. 4). The shell 158 and groove 156 define a compartment through which cooling water flows between the fittings 171 and 173. The grooves 163 and 165 are a part of the water path. These grooves are formed into chambers to receive and transmit the water by a cap 166 which is bolted to the head 155 with a gasket 168 interposed between the cap and the head. The shaft 151 has a central opening 181 which terminates in the head 153 and is connected through a transverse channel 183 in the head 155 to a gas fitting 185 through which gas flows into the opening 181.

Below the attenuated section 157 the shaft 151 has a section 191 (FIG. 5) of larger diameter. This section has a groove 193 closed by another shell 195 brazed to the section 191. A transverse channel 197 connects the chamber defined by the groove 193 and shell 195 to the opening 181 and another transverse channel 198 connects this chamber to an expanded opening 199 in the end of the shaft 151. The gas which flows through the opening 181 is by-passed through the chamber 193 into the space 201 around the electrode 23.

The electrode 23 is carried by a collet 211 which extends into the end of the central opening 181 through the shaft 151. The collet 211 is urged into holding engagement with the electrode 23 by a collet body 213 which screws into the end of the shaft 151. A cup 215 provided on the outside is screwed onto the end of the collet body. The end 217 of the collet body 213 which compresses the collet has openings (not shown) through which the gas is conducted through the space 201 between the collet body 213 and the electrode. This gas flows through the cup 215 shielding the welding arc.

The shaft 151 is mounted in the eccentric opening in the sleeve 141. By rotating the sleeve the spacing of the electrode 23 from the axis of rotation of the torch may be set and the apparatus may be adapted for welding of joints of different diameters.

The torch is rotated through gear 133 from a motor 221 mounted on a bracket 223 suspended from support 111. The motor 221 drives a gear 225 which drives gear 133 through an idler 227. The bearing for the idler 227 is in support 111.

In the use of the apparatus the work is disposed below the carriage 31. The carriage is moved along tracks 27 until it is over the joint to be welded. The pilot is then centered in the joint and the carriage 31 is locked with the air locks 29 in both axis. The handle 21 is then operated to rotate the spindle from the position in which the portion 101 of member 81 is in groove 73 to the position in which the portion 101 is in groove 75. The electrode 23 is then in welding position. An arc is fired between the joint and the electrode and the electrode and arc are moved around the joint to produce a weld.

While preferred embodiments of this invention have been disclosed herein, many modifications thereof are feasible. This invention then is not to be restricted except insofar as is necessitated by the spirit of the prior art.

We claim as our invention:

1. Apparatus for welding a tube into a plate, said tube extending into said plate and said tube and plate defining a joint to be welded about the axis of said tube, the said apparatus comprising a pilot having an axis, said pilot being dimensioned to enter said tube in pilot-centering relationship with respect to said tube so that the axis of said pilot is substantially coincident with the axis of said tube, means mounting said pilot to be set in centering relationship with said tube, locking means connected to said mounting means for locking said mounting means in a position in which said pilot is centered in said tube, an arc-welding electrode connected to said pilot, said arc-welding electrode being rotatable about an axis at a radius substantially equal to the radius of said joint in welding relationship with said joint, and means, movable while said mounting means is locked as aforesaid, connected to said electrode and pilot for removing said pilot from said tube and setting said electrode so that the axis about which said electrode is rotatable as aforesaid is substantially coincident with the axis of said tube.

2. Apparatus for welding a tube into a plate, said tube extending into said plate and said tube and plate defining a joint to be welded about the axis of said tube, the said apparatus comprising a pilot having an axis, said pilot being dimensioned to enter said tube in pilot-centering relationship with respect to said tube so that the axis of said pilot is substantially coincident with the axis of said tube, means mounting said pilot to be set in centering relationship with said tube, an arc-welding electrode connected to said pilot, said arc-welding electrode being rotatable about an axis at a radius substantially equal to the radius of said joint in welding relationship with said joint, and means connected to said electrode and pilot for removing said pilot from said tube and setting said electrode so that the axis about which said electrode is rotatable as aforesaid is substantially coincident with the axis of said tube.

3. The apparatus of claim 2 wherein the removing means includes means for disposing said electrode a substantial distance from said plate when said pilot is moved into centering relationship with said tube and for causing said electrode to approach said plate when said electrode is moved into welding relationship with said joint.

4. The method of welding a tube, of relatively small outside diameter to a plate, the said method comprising inserting said tube in said plate to form a circular joint to be welded between said tube and plate about the axis of said tube, centering a pilot in said tube with the axis of said pilot substantially coincident with said axis of said tube, removing said pilot, and automatically on removal of said pilot and in dependence on the centered setting of said pilot, centering an arc-welding electrode with its welding tip rotatable in arc-welding relationship about an axis on a radius substantially equal to the radius of said joint, with said last-named axis substantially coincident with said axis of said tube, firing an arc between said electrode and joint, and rotating said electrode to rotate said arc along said joint to weld said joint.

5. Apparatus for welding a tube into a plate, said tube extending into said plate and said tube and plate defining a joint, to be welded, about the axis of said tube, the said apparatus including a pilot having an axis, said pilot being dimensioned to enter said tube in pilot-centering relationship with respect to said tube so that said axis of said pilot is substantially coincident with the axis of said tube, an arc-welding electrode with its arc-welding tip rotatable about an axis at a radius substantially equal to the radius of said joint, and means connected to said pilot and electrode for moving said pilot and electrode back and forth between a first position in which the axis of said pilot is substantially coincident with the axis of said tube and a second position in which the axis about which said electrode tip is rotatable is substantially coincident with the axis of said tube.

6. Apparatus for welding a tube into a plate, said tube extending into said plate and said tube and plate defining a joint, to be welded, about the axis of said tube, the said apparatus including a pilot having an axis, said pilot being dimensioned to enter said tube in pilot-centering relationship with respect to said tube so that said axis of said pilot is substantially coincident with the axis of said tube, an arc-welding electrode with its arc-welding tip movable about said axis over said joint in welding relationship with said joint, and means connected to said pilot and electrode for moving said pilot and electrode back and forth between a first position in which the axis of said pilot is substantially coincident with the axis of said tube and a second position in which the axis about which said electrode tip is movable is substantially coincident with the axis of said tube.

7. The apparatus of claim 7 including mounting means for said pilot and electrode and means for locking said mounting in any setting, the moving means being movable with respect to said mounting means with said mounting means locked in any position.

8. The apparatus of claim 6 including means connected to the moving means for displacing said electrode outwardly from said plate on the operation of said moving means to a position in which the axis about which the tip of said electrode is rotatable is displaced from the axis of said tube.

9. The method of welding to a plate a tube, of relatively small cross-sectional dimensions, the said method comprising inserting said tube in said plate, centering a pilot in said tube with the axis of said pilot substantially coincident with the axis of said tube, removing said pilot, and automatically on removal of said pilot and in dependence on the centered setting of said pilot, setting an arc-welding electrode with the welding tip of said electrode capable of being moved about an axis over said joint, with said last-named axis substantially coincident with the axis of said tube, firing an arc between said electrode and joint, and moving said electrode to move said arc along said joint to weld said joint.

References Cited

UNITED STATES PATENTS

| | | | |
|---|---|---|---|
| 2,818,493 | 12/1957 | Pilia et al. | 219—125 |
| 2,908,805 | 10/1959 | Apblett et al. | 219—125 |
| 3,035,157 | 5/1962 | Armstrong et al. | 219—125 |
| 3,064,120 | 11/1962 | Ache | 219—125 |
| 3,142,745 | 7/1964 | Gotch | 219—125 |
| 3,209,120 | 9/1965 | Glatthorn | 219—125 |

RICHARD M. WOOD, *Primary Examiner.*

W. D. BROOKS, *Assistant Examiner.*